March 10, 1931.  A. C. OLSON  1,795,574

VEHICLE WHEEL

Filed July 22, 1929

Inventor

Albin C. Olson.

By Geo Stevens.

Attorney

Patented Mar. 10, 1931

1,795,574

UNITED STATES PATENT OFFICE

ALBIN C. OLSON, OF DULUTH, MINNESOTA

VEHICLE WHEEL

Application filed July 22, 1929. Serial No. 380,214.

This invention relates to vehicle wheels and has special reference to a wheel having wire spokes particularly adapted for use in automobile construction.

The principal object is to produce a more practical and stronger wire spoke wheel than heretofore known.

Other objects and advantages of the invention will appear in the following description thereof.

Referring now to the accompanying drawing, forming part of this application, and wherein like reference characters indicate like parts:

Figure 1:
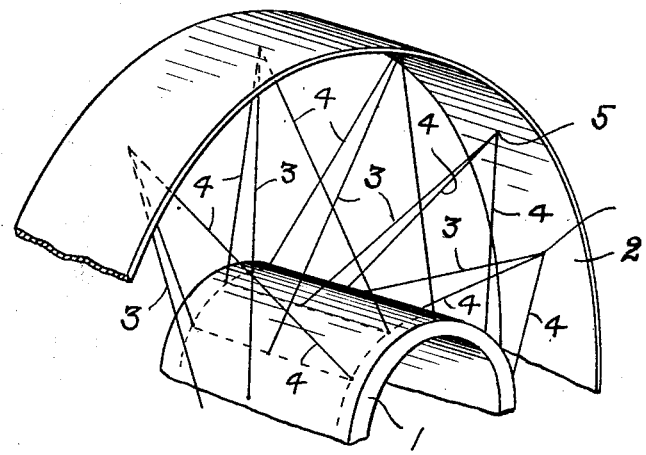
Figure 1 is a fragmental portion of a wheel in diagrammatic perspective to more clearly illustrate the specific arrangement of spokes.

1 represents the hub of the wheel and 2 the rim or felly, both of which are shown more or less conventionally, as it is obvious that they may be of various forms without departing from the spirit of the invention which resides more particularly in the specific arrangement of spokes. 3 and 4 represent the two different series of spokes, the former being what I shall refer to as the central tangential spokes and the latter as the obliquely disposed side spokes. The particularly novel feature of this invention in connection with the arrangement of spokes is that they are disposed in tripodal groups, each comprising one of the central spokes 3 and two of the side spokes 4, preferably meeting at a single point of attachment 5 to the rim 2, and with the hub engaging end of the central spoke 3 occurring in direct line with the hub engaging ends of the side spokes of the second preceding group, thus forming three circumferential lines of hub engaging points of the spokes about the hub as clearly indicated in Figure 1 of the drawings. In no instance, however, do any of the spokes cross each other in close juxtaposition, as is common in wire wheels.

Figure 2:
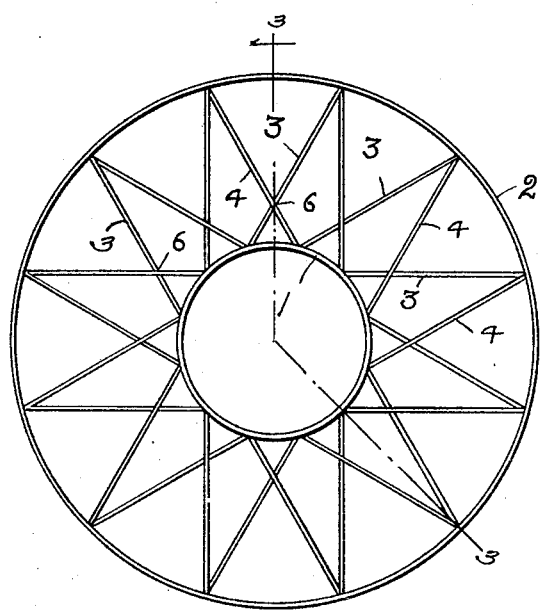
Figure 2 is a side elevation of one of the improved wheels.

It will also be noted in the preferred arrangement of spokes that the side spokes of one group and the central spoke of the second preceding group are parallel, while the central spoke of the first mentioned group and the side spokes of the last mentioned groups are disposed diagonally intermediate the parallel portions of the two groups and cross each other centrally of the parallel portions adjacent the hub as viewed from the side elevation shown in Figure 2, at 6.

Still another characteristic of the arrangement of spokes is that the side spokes of one group are disposed at right angles to the central spokes of the second succeeding group in each and every instance, the preferred arrangement of the spokes being that of a symmetrically disposed twelve pointed star, as viewed laterally and illustrated in Figure 2 of the drawings.

Figure 3:
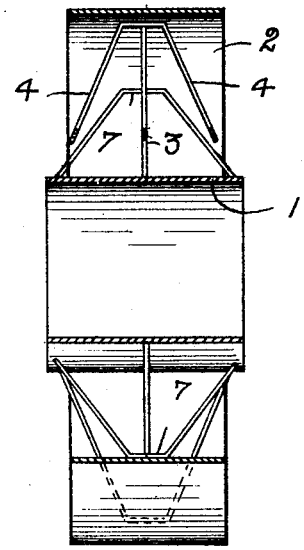
Figure 3 is a transverse section on the line 3—3 of Figure 2.

It will be noted that I have shown a slightly modified form of connection of the spokes to the rim 2 in Figure 3, this being the preferred construction for heavy duty wheels such as truck wheels or the like, and wherein the side spokes terminate against the rim in a somewhat extended straight angular portion 7, thus spacing the points of direct thrust of the spokes.

Having thus described my invention, what I claim and desire to secure by Letters Patent, is:

1. A wire spoke wheel of the class described comprising spokes arranged in tripodal groups of two side spokes and one central spoke circumferentially about the wheel, the side spokes of one group and the central spoke of the preceding group being parallel.

2. A wire spoke wheel of the class described comprising spokes arranged in tripodal groups of two side spokes and one central spoke, the side spokes of one group and the central spoke of the second succeeding group being at right angles to each other.

In testimony whereof I affix my signature.

ALBIN C. OLSON.